Oct. 24, 1967 R. W. BRIGGS ETAL 3,349,244
IR BACKGROUND NOISE DISCRIMINATOR THROUGH
SELECTIVE TIME GATES

Filed June 25, 1964 3 Sheets-Sheet 1

INVENTORS.
RAYMOND W. BRIGGS,
SHELDON JONES,
BY Robert Thompson
ATTORNEY.

though this type of system did provide a degree of discrimination in tracking point sources of radiation, the detector also picked up background radiation from clouds, ground, sun and other objects. Reducing the optical aperture did not tend to reduce the amount of backgrund noise picked up by the detector; but this approach also reduced the field of view and as a result reduced the tracking capability of the system. Consequently, a violently maneuvering source of radiant energy could quickly leave the field of view and become unlocked from the tracking system.

United States Patent Office 3,349,244
Patented Oct. 24, 1967

3,349,244
IR BACKGROUND NOISE DISCRIMINATOR
THROUGH SELECTIVE TIME GATES
Raymond W. Briggs, Manhattan Beach, and Sheldon Jones, Palos Verdes Estates, Calif., assignors to Hughes Aircraft Company, Culver City, Calif., a corporation of Delaware
Filed June 25, 1964, Ser. No. 377,882
10 Claims. (Cl. 250—83.3)

This invention relates to a radiation detecting and tracking system and more particularly to a gating device for use in such a system and which discriminates against unwanted background noise signals in the tracking field of view.

Crosses detector arrays such as described in U.S. Patent 3,069,546 to R. W. Buntenbach, issued Dec. 18, 1962, have been used in nutating scan type of radiation detection and spatial coordinate translation systems. Basically, a nutated image of a detected radiation source was reflected onto a crossed array of detector cells to generate electrical pulse information timed in accordance with the relative radial displacement of the radiation and the resultant nutated image from a central axis of rotation. Although this type of system did provide a degree of discrimination in tracking point sources of radiation, the detector also picked up background radiation from clouds, ground, sun and other objects. Reducing the optical aperture did not tend to reduce the amount of backgrund noise picked up by the detector; but this approach also reduced the field of view and as a result reduced the tracking capability of the system. Consequently, a violently maneuvering source of radiant energy could quickly leave the field of view and become unlocked from the tracking system.

It also has been noted that when a source of radiant energy is displaced sufficiently far from a central axis so as to be in the fringe area of the field of view, hereinafter referred to as side lobes, a single detector cell is scanned by the nutating image thereby generating a single pulse signal during a complete nutation cycle. This single pulse signal is not especially usable for translation to spatial coordinate information since the source of radiation could be located at any point in the side lobe. In addition, background objects located in the side lobes add to background noise of the type previously referred to.

Accordingly, it is an object of this invention to reduce the effective aperture of an infrared detector without reducing the effective usable field of view.

Another object is to discriminate between usable infrared signals and unusable infrared signals by electronically blanking out unusable portions of a scan area.

Still another object is to provide a radiation detector which senses only a portion of the scanned background at any instant by periodically blanking out those portions of the background which are incapable of providing useful information during a predetermined time interval.

Another object of this invention is to provide a gate circuit which discriminates against relatively positive polarity pulse signals during a portion of a complete time period, and discriminates against relatively negative polarity pulse signals during the remaining portion of the complete time cycle.

These and other objects of this invention are achieved by the use of an electronic gate for a crossed array infrared detector system in which the target image is nutated about the crossed array of infrared detectors to provide pulse information of relatively positive and negative polarities pertaining to the position of a source of radiation and in which the gating means discriminates against one polarity of pulse signal during a portion of the nutation cycle and discriminates against the other polarity of pulse signal during the remaining portion of the nutation cycle, whereby only those pulses which provide usable information as to target positions are not blocked.

Other objects, features and advantages of this invention will become apparent upon reading the following detailed description of the preferred embodiment of this invention and referring to the accompanying drawings in which.

Figure 1:
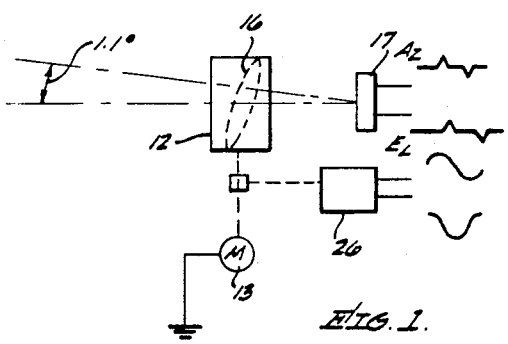
FIG. 1 is a block diagram of a nutating optical system illustrating the tilted relationship of the optical axis to the mechanical axis of rotation.

As illustrated in FIG. 1, a nutating optical system can include a rotatable sleeve 12 which is connected to be rotated about a mechanical axis by a motor 13. A lens 16 is mounted within the sleeve so that the optical axis is tilted at an angle, 1.1° for instance, to the mechanical axis of lens rotation. In operation, as also illustrated in the exaggerated geometric perspective of FIGS. 2a and 2b, the detected radiation is nutated in a cone of revolution to project an image about a circular path for scanning a crossed array of radiation detector cells 17. Although the system is illustrated as a refractive optical system, it is fully possible to use reflective nutating systems such as those described in the previously referenced U.S. Patent No. 3,069,546 and U.S. Patent No. 3,117,231 to H. E. Haynes, issued Jan. 7, 1964.

Figure 2A:
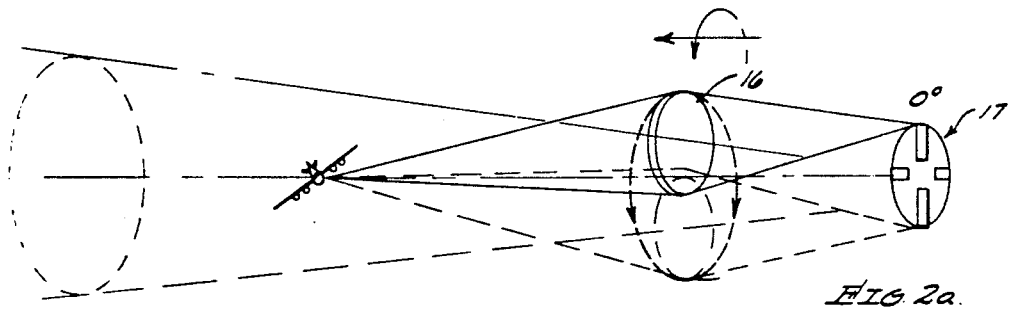
FIGS. 2a and 2b are diagrammatic illustrations of the geometric relationship of a cone of revolution of an optical system and a crossed detector array to a source of radiant energy for on-center and off-center target conditions, respectively.
Figure 2B:
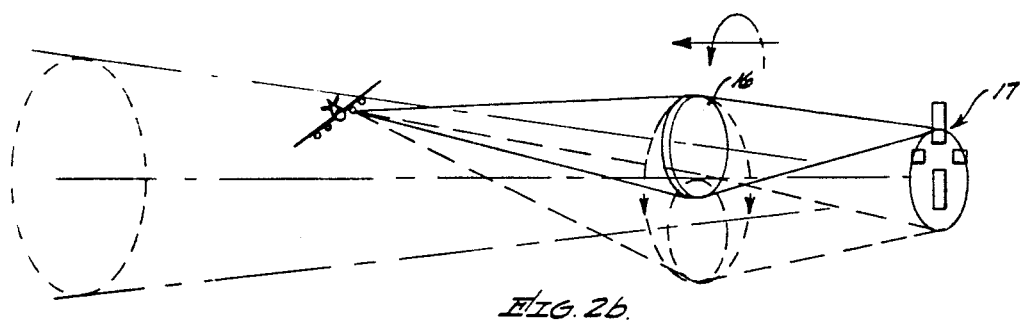
Figure 4A:
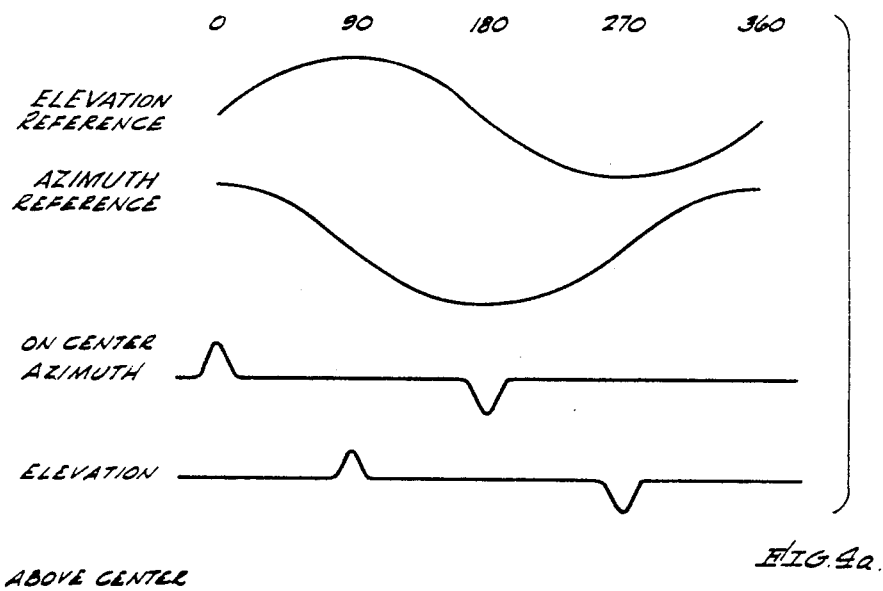
FIGS. 4a and 4b are graphic illustrations of the relationship between the waveforms of an AC reference signal and target information pulses generated by the nutating image when the target is on-center and off-center, respectively.
Figure 4B:
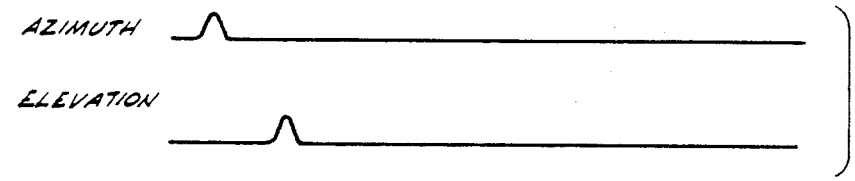

Referring back to the diagrammatic illustration of FIGS. 2a and 2b, as the nutated image scans each individual detector cell a pulse is generated from which target azimuth (Az) or elevation (El) position information can be obtained. In target tracking operations, where the source of radiation is on a central axis of lens rotation (FIG. 2a), the cells are scanned at equally spaced 90° intervals thereby generating four equally spaced pulses (FIG. 4a). In target tracking operations where the source of radiation is above or displaced from the central axis of lens rotation (FIG. 2b) the projected image is nutated about the crossed array to generate pulses which are not equally spaced from one another (FIG. 4b). By use of pulse detector and pulse translation circuitry (not shown) it would be possible to convert these pulse signals into usable signal information as to the azimuth and elevation of the source of radiation with relation to the central axis of rotation.

Figure 3:
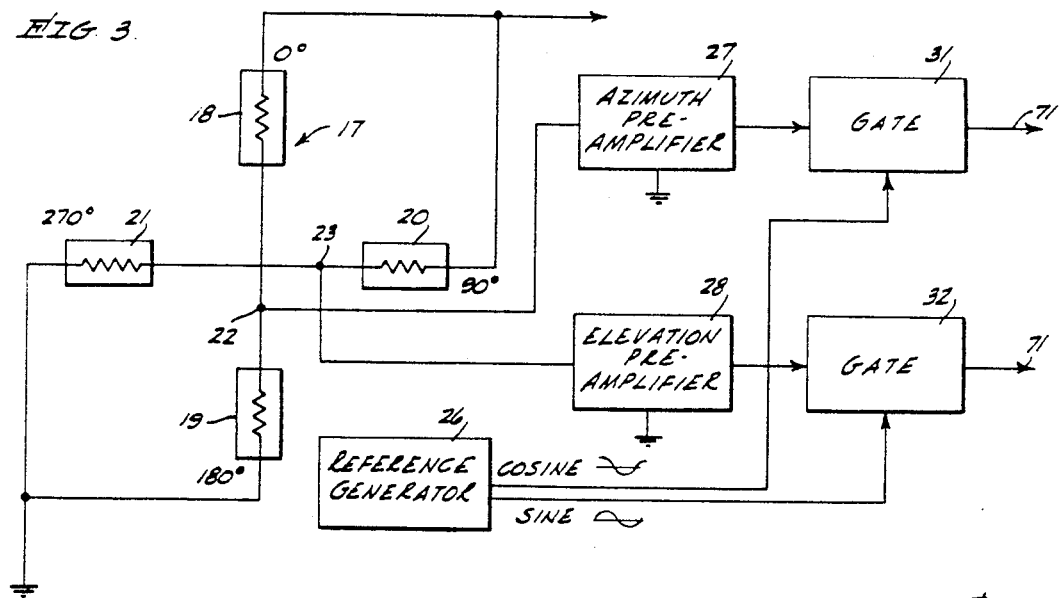
FIG. 3 is a schematic block diagram of a radiation detector tracking system and gate circuit.

Now referring to the tracking system in more detail, FIG. 3 illustrates a schematic block diagram of a crossed-array tracking system which operates on the above-discussed nutating image principle. As the nutating image is scanned about the crossed array of detector cells 17 a plurality of individual lead selenide detector cells 18, 19, 20 and 21 vary in resistance as the image strikes them to unbalance the resistance of the connected cell pairs 18–19 and 20–21 and to generate a pulse at the individual output terminals 22 and 23. Considering the connected cell pair 18–19 to be an azimuth detection arm having a center tap output terminal 22 and the connected cell pair 20–21 to be an elevation detection arm having a center tap output terminal 23, one end of each arm is connected to a reference terminal of a potential source (not shown) while the opposite end of each arm is connected to a positive terminal of the potential source. Thus, as radiation strikes any one of the cells the resistance of that particular cell decreases to unbalance that arm and vary the potential at the related center tap output 22 or 23. For example, radiation striking the upper azimuth cell 18 decreases the resistance of that cell to unbalance the azimuth arm and generate a positive polarity pulse signal or lower potential at azimuth output terminal 22; conversely, radiation striking lower azimuth cell 19 will also unbalance the azimuth arm to generate a relatively negative polarity or lower potential pulse signal on the azimuth output terminal 22. Similarly, radiation striking the right-hand elevation cell 20 will decrease its resistance to unbalance the elevation arm and generate a positive pulse on the elevation output terminal 23; conversely, radiation striking the left-hand elevation cell 21 will also unbalance the elevation arm and generate a negative polarity or lower potential pulse on elevation output terminal 23. Thus, positive pulses are generated during one-half of the nutation cycle and negative pulses during the remaining half of the cycle. Hereafter, such short term changes in potential at the center taps will be referred to as positive or negative polarity pulses.

As graphically illustrated in FIGS. 4a and 4b, the pulse signals generated by an unbalancing of the detector arms have a rounded waveform and are of a relatively low amplitude. In addition, two 90° out of phase A.C. reference signals having a time period equal to the time of a nutation cycle are generated by a reference signal generator 26 which is coupled to be driven in exact synchronism with the rotating optical system. Appropriate means for generating this A.C. reference signal is disclosed in the previously referenced U.S. Patent No. 3,117,231.

The pulse signals generated at the azimuth and elevation detector arm are applied to an azimuth signal preamplifier 27 and an elevation signal preamplifier 28, repectively, for amplifying the pulse signals to a usable level. These amplified pulses are thereafter fed from the preamplifiers 27 and 28 to an azimuth gating circuit means 31 and an elevation gating circuit means 32, respectively. By introducing the A.C. reference signals to the gates 31 and 32, each gate can be selectively biased to gate only the positive polarity pulse signals during one-half of the nutation cycle, and negative polarity pulses during the remaining half of the nutation cycle.

Figure 5:
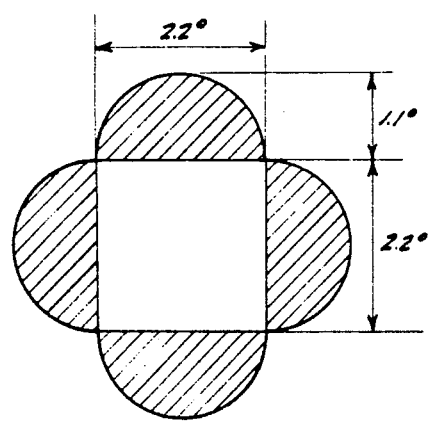
FIG. 5 is a schematic illustration showing the relationship of an ungated tracking region and the gated tracking square in which the blanked out side lobes of unusable pulse information are illustrated with cross-hatch lines.

As previously discussed, one reason for selectively gating the pulse signals is that once the target is displaced beyond a certain field of view and into any one of the simicircular side lobes illustrated in FIG. 5, the nutated image will only scan a single one of the radiation detecting cells during a complete nutation cycle. As a result the pulse information obtained is not especially usable for information on the target position. In addition, radiation from background objects, such as clouds, ground and distant targets, located in the side lobes can be detected by the cells to generate noise signals which in some instances can cause the tracking system to unlock from the target.

Thus, by synchronizing the A.C. reference signal generator 26 with the mechanical rotation of the optical lens 16 it is possible to electronically blank those portions of the field of view which do not provide useful target information and which merely add to background noise signals. As illustrated graphically in FIGS. 4a and 4b, the azimuth cosinusoidal waveform has a positive polarity when the optical system scans a sector from $0°\leq\theta\leq 90°$, has a negative polarity when the optical system scans a sector from $90°\leq\theta\leq 270°$ and again has a positive polarity when the optical system scans a sector from $270°\leq\theta\leq 360°$ of the nutation cycle. Thus, it is possible to use the positive polarity portion of the cosinusoidal reference signal to limit azimuth pulse conduction to only positive polarity pulses produced by the relatively positively biased detection cell 18 during the portion of the nutation cycle from $270°\leq\theta\leq 90°$ and to use the negative polarity portion of the cosinusoidal reference signal to limit azimuth pulse conduction to only the negative polarity pulse signal generated by the relatively negatively biased cells 19 during the portion of the nutation cycle from $90°\leq\theta\leq 270°$.

As a result of this gating it is possible to blank the semicircular side lobes of FIG. 5 from the detector field of view and limit the tracking region to 2.2° square. The peripheries of the blanked semicircular side lobes are defined by the circular path of the nutated image at extreme target positions; in other words, when the nutated image scans only a single one of the radiation detector cells during a complete nutation cycle. The radiation detector cells 18 through 21 can be considered to be effectively enclosed within the square trackable region so that a portion of the nutated image path enclosed within the trackable square will intersect one cell and generate a single pulse. It should of course be understood that all four extreme conditions cannot happen at the same instant for a single image since the source can only be located in one of the side lobes at any one time. Thus, any time that the images are displaced sufficiently far from the control arms to be in the side lobe region they are out of phase with the AC reference signal and are electronically blanked out thereby eliminating unusable target information while at the same time eliminating background noise generated in these side lobes.

In operation, as the nutating image scans the crossed detector cells 18–21, the azimuth detector cells 18 and 19 generate positive and negative pulse signals, respectively, at the center tap 22 which pulses are applied to the azimuth preamplifier 27. The two elevation detector cells 20 and 21 also generate positive and negative pulses, respectively, at the center tap 23 as the cells are scanned by the nutated image.

Since the azimuth channel elements and the elevation channel elements are substantially identical to one another except that the azimuth channel is gated by the cosinusoidal reference signal and the elevation channel is gated by the sinusoidal reference signal, only those circuit elements in the azimuth branch are described in detail.

Figure 6:
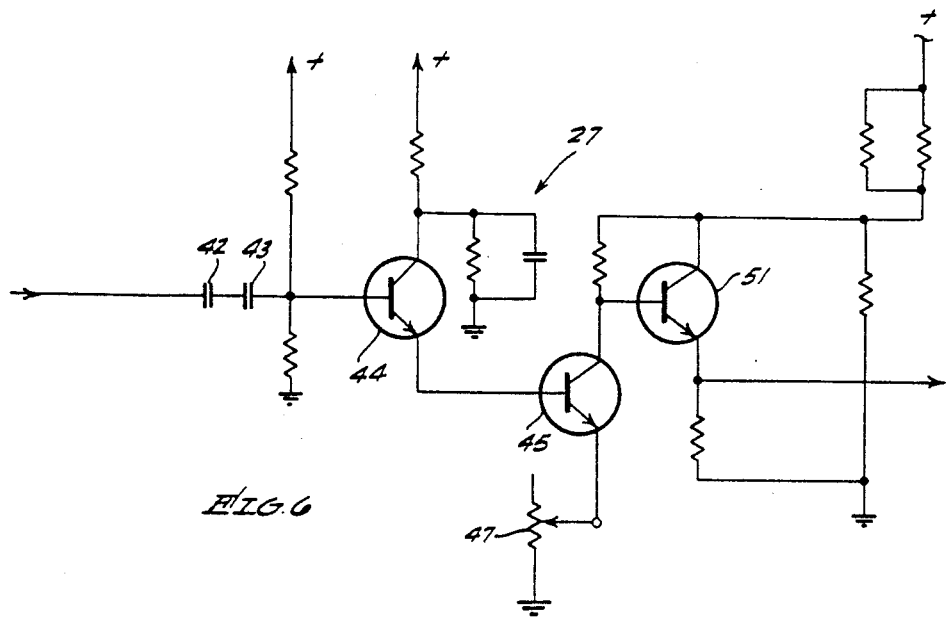
FIG. 6 is a schematic circuit diagram of a preamplifier circuit of the pulse circuit.

Referring to the azimuth preamplifier circuit diagram of FIG. 6, the output pulses from the azimuth detector arm are applied to the azimuth preamplifier 27 through a pair of coupling capacitors 42 and 43 and to the base of an emitter follower stage transistor 44. The emitter follower 44 is directly coupled to the base of an amplifier stage transistor 45 and provides an impedance match between the detector cells 18–19 and the amplifier stage. An adjustable resistor 47 is connected between the emitter of the amplifier stage transistor 45 and a reference potential terminal of the voltage source for producing a negative feedback signal and providing circuit stability and gain adjustment for the amplifier stage. By making the gain of the amplifier stage transistor 45 adjustable it is also possible to insure balanced preamplifier outputs. The collector terminal of the amplifier stage transistor 45 is directly coupled to the base terminal of an output stage emitter follower 51 which in turn provides impedance matching between the amplifier stage and the output to the gate circuit 31.

Figure 7:
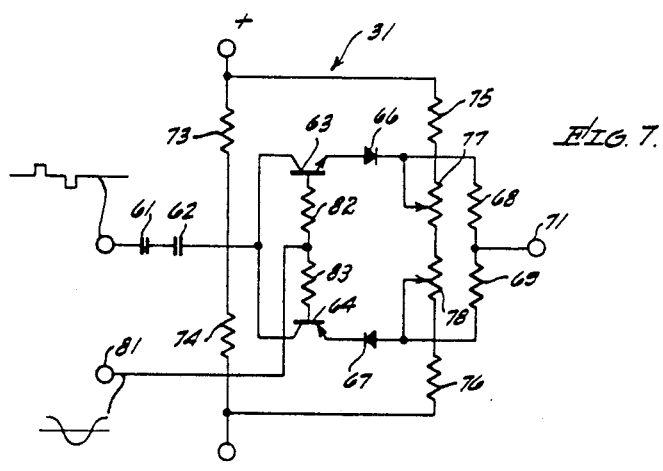
FIG. 7 is a schematic circuit diagram of a pulse gate of this invention.

The amplified pulse signals appearing at the emitter of transistor 51 are coupled to azimuth gate means 31 through a pair of coupling capacitors 61 and 62 (FIG. 7) wherein only those pulses having a relatively positive polarity will be transmitted or conducted by one branch of the gate during one-half of a nutation cycle, and wherein only those pulses having a relatively negative polarity will be transmitted or conducted by a second branch of the gate during the remaining half of a nutation cycle. Generally, the gating circuit includes a pair of transistors 63 and 64 which are of complementary conductances with the output or emitter of each transistor being connected to one of a pair of biased diodes 66 and 67, respectively. These individual diodes are biased and oppositely polarized relative to one another so that the diode 66 will only conduct or transmit relatively positive polarity pulses while diode 67 will transmit or conduct only relatively negative polarity pulses. The outputs of each of the diodes are connected through individual load resistors 68 and 69 so as to generate or produce positive and negative output pulses at an output terminal 71. A balanced diode bias is supplied to the circuit by a voltage divider circuit including fixed resistors 73–74 and 75–76 and variable resistors 77–78 connected between a positive polarity terminal of a voltage source and a negative potential terminal of the same voltage source. To set the emitter bias voltage the variable resistors 77 and 78 can be adjusted thereby setting the turn-on bias level for the transistors 68 and 69 respectively.

The cosinusoidal reference signal is applied to a gate input terminal 81 to selectively base bias the transistors 63 and 64 so that one transistor is in the cut-off state and the other transistor is conducting. Thus, as the amplitude of the AC reference signal becomes positive the n-p-n transistor 63 is forward base emitter biased to a conducting state by the voltage developed across a base resistor 82, while the p-n-p transistor 64 is reverse base emitter biased to a cut-off state by the voltage developed across a base resistor 83. Thus, with the transistor 64 cut-off, the positive and negative pulse signals applied to the collector of the conducting transistor 63 are conducted to the associated gating diode 66. Because the gating diode 66 is biased and polarized to conduct only positive polarity pulses, the negative polarity pulses are blocked and thus only the positive polarity pulses are developed at output terminal 71. From this it can be seen that at any time that the AC reference signal is positive the gate will only pass positive pulses to the output.

When, however, the AC reference signal becomes negative, the n-p-n transistor 63 is reverse base emitter biased to a cut-off state while the p-n-p transistor 64 is forward base emitter biased to a conducting state. As a result the pulse input to the now cut off transistor 63 is blocked while the pulse input to the now conducting transistor 64 is conducted. These conducted pulses are applied to the input of the associated gating diode 67 which is biased and polarized to pass or conduct only the negative polarity pulses so as to generate only negative polarity pulse signals on the output terminal 71.

In summary, one solid state branch of the gate 31 will only pass negative polarity pulses when the AC reference signal is relatively negative, and the other solid state branch will only pass positive polarity pulses when the AC reference signal is relatively positive. Thus, since the AC reference signal is negative one-half of the time the gate will block positive pulses one-half of the time, and since the AC reference signal is positive one-half of the time the gate will block negative signals the remaining half of the time.

Thereafter, the gated pulse output is fed or applied to appropriate information translating circuits (not shown) so that error signals can be generated in accordance with the gated pulse information.

It should be understood of course that this disclosure relates to only a preferred embodiment of the invention and that modifications and alterations may be made therein without departing from the spirit and the scope of the invention.

What is claimed is:

1. In an infrared radiation detector system of a type including a crossed pair of radiation sensitive detector arms, a nutating optical system connected to selectively scan the individual arms of the crossed array with a nutating image of detected radiation to generate a pulse signal each time an arm is scanned, the pulses generated on one-half of each arm being of a positive reference potential and the pulse signals generated on the other one-half of each arm being of a negative reference potential, and a reference signal generating means connected to the nutating optical system for generating an AC reference signal having a time period equal to the time period of one nutation cycle, the combination therewith of: a first and a second amplifier means each connected to receive the pulsed signals generated from individual ones of the detector arms, and being operable to amplify the pulses; first and second electrical gating means connected to receive the signals from said first and said second amplifier means, respectively, each said gating means each including a bias circuit connected to be selectively biased by the AC reference signal against transmitting pulse signals of a first relative polarity during one-half of a nutation cycle, and to be relatively biased by the AC reference signal against transmitting pulse signals of an opposite relative polarity during the remaining one-half of the nutation cycle whereby only those signals generated by one-half of each arm will be detected at any instant.

2. In an infrared radiation detector system of a type including a crossed pair of radiation sensitive detector arms, a nutating optical system connected to selectively energize the individual arms of the crossed array by scanning the arms with a nutating image of the detected radiation to generate pulse signals each time an arm is scanned, the pulse signals generated on one-half of each arm being of a positive reference polarity and the pulse signals generated on the other one-half of each arm being of a negative reference polarity, and a reference signal generating means connected to generate an AC reference signal having a time period equal to the time period of one nutation cycle, a pulse discriminator comprising:

a first and a second amplifier means each connected to amplify pulses received from individual ones of the pair of detector arms;

a first gate means and a second gate means connected to receive amplified pulses from said first and said second amplifiers, respectively;

and a first and a second bias circuit connected to bias said first and second gate means, respectively, in accordance with the relative amplitude of the AC reference signal to block only relatively negative polarity pulses when the amplitude AC reference signal is above a predetermined reference voltage and to block only relatively positive polarity pulses when the AC reference signal is below a predetermined reference voltage, whereupon those pulses generated out of time phase with the AC reference signal are blocked against transmission, and whereupon those pulses generated in time phase with the AC reference signal are transmitted.

3. In a radiation detector system of the type including a detector having an optical system for nutating an image of detected radiation, a detector circuit having a crossed pair of radiation sensitive arms positioned to be scanned by the nutated image;

first circuit means connected to one of the crossed arms to generate pulses of relatively positive polarity on one-half of the arm and pulses of relatively negative polarity on the other half of the arm when the arm is scanned by the nutated image;

second circuit means connected to the other of said crossed arms to generate pulses of relatively positive polarity on one-half of the arm and pulses of relatively negative polarity on the other half of the arm when the arm is scanned by the nutated image;

first gate means and second gate means connected to said first and said second circuit means, respectively, each gate means including electron valve means, connected to selectively transmit and block the positive and negative polarity pulse signals;

reference signal generating means connected to generate an AC signal having a time period equal to the time period of a nutation cycle;

and bias means connected to transmit the AC reference signal to each of said gating means to bias said gating means against the transmission of relatively positive polarity pulses during one portion of a nutation cycle and to bias said gating means against transmission of relatively negative polarity pulses during the remaining portion of said nutation cycle, whereby only those pulses generated on one-half of each arm are transmitted at any one time.

4. In a radiation detector system of the type having an optical system for nutating an image of the detected radiation, a detector circuit having a crossed pair of detector arms positioned to be scanned by the nutated image, and means for generating an AC reference signal; a gating circuit including:

first circuit means connected to one of the crossed arms to generate pulses of relatively positive polarity on one-half of the arm and pulses of relatively negative polarity on the other half of the arm when the respective halves of the arm are scanned by the nutated image;

second circuit means connected to the other of said crossed arms to generate pulses of relatively positive polarity on one-half of the arm and pulses of relatively negative polarity on the other half of the arm when the halves of the arm are scanned by the nutated image;

a first gating means and a second gating means connected to said first and said second circuit means, respectively, each said gating means including a first circuit branch of a first relative conductivity and a second circuit branch of an opposite relative conductivity;

and first and second bias means connected to selectively bias said first and said second gating means with the AC reference signal, each said gating means being connected to said first and said second circuit branches of each of said gate to simultaneously bias one branch conductivity against conduction of all pulses and bias the other branch conductivity for conduction of selected polarity pulses.

5. In combination with a radiation detector of the type having an optical system connected to nutate an image of detected radiation, a discriminator comprising:

a radiation detector having a first and second detector are positioned relative to the optical axis in a crossed array to be scanned by the nutating image;

a first and a second circuit means connected to said first and said second detector arm, respectively, to generate pulses of opposite polarity on each half of said individual arm as the arms are scanned by the nutating image;

a first and a second gate means connected to said first and second circuit means, respectively, to selectively transmit pulse signals, each of said gate means including a first and a second electronic valve connected to a first and a second unidirectional conductor, respectively, each unidirectional conductor being of opposite polarity to the other whereby one of the unidirectional conductors will transmit only relatively negative polarity pulses and the other of said unidirectional conductor will transmit only relatively positive polarity pulses;

reference generator means connected to generate an AC reference signal having a time period equal to the time period of a nutation cycle;

and bias means connected to transmit the AC reference signal to all of said electron valves to simultaneously bias one of said electron valves in each said gate means into cut off and bias the other of said electron valves in each said gate means into a conducting state whereby only pulses of a predetermined polarity are conducted during any predetermined time interval of a nutation cycle.

6. In a radiation detector of the type having an optical system connected to nutate an image of detected radiation about a cone of revolution, a discriminator comprising:

a radiation detector having a first and a second radiation detector arm, each crossed with the other and being positioned relative to the axis of the optical system to be scanned by the nutating image;

a first and a second circuit means connected to the first and the second detector arm, respectively, to generate pulse signals of opposing polarity on each half of said individual arm as the arms are scanned by the nutating image;

a signal generating means connected to generate an AC reference signal having a time period equal to the time period of a nutation cycle;

a first and a second gating means each connected to selectively transmit the negative and positive pulse information, each of said gating means including a first circuit branch having a transistor of a first conductance and a second circuit branch having a transistor of a complementary conductance, the first said circuit branch also including a diode having polarity to conduct relatively positive polarity pulses and the second said circuit branch having a diode connected to conduct relatively negative polarity pulses;

and bias circuit means for simultaneously applying a reverse bias signal to one of said transistors and applying a forward bias signal to the other of said transistors being connected to simultaneously introduce the AC reference signals to a control terminal of each of said transistors, whereby during selected time intervals of a nutation cycle one of said circuit branches is reverse biased against transmitting all pulses and the other said circuit path is forward biased to conduct only those pulses of either a relatively positive polarity or a relatively negative polarity.

7. A pulse circuit for use with an AC reference gating signal including: a pair of circuit branches having complementary conductances and unidirectional transmission characteristics of opposite polarity;

bias means coupled to simultaneously introduce the AC gating signal to said branches for first reverse biasing one of said branches to a cut-off state and forward biasing the other of said branches into a conduction state when the AC reference voltage is above a first amplitude, and for next forward biasing the said previously reverse biased one of said branches to a conduction state and reverse biasing the said previously forward biased one of said branches when the AC reference signal is below a predetermined amplitude;

and means coupled to introduce pulse signals to said branches whereby the forward biased branch will conduct those pulses having a predetermined polarity and the reverse biased branch will block all pulse conduction.

8. A pulse gate of the type which discriminates between positive and negative polarity pulses in accordance with the phase and relative polarity of an AC reference signal, including:

a first and a second solid state circuit branch, said branches being characterized by opposite conductances and unidirectional transmission capabilities of relatively opposite polarity;

bias means connected to simultaneously introduce an AC gating signal to said solid state branches for alternately applying a reverse bias signal to drive one of said branches to a cut-off state and applying a forward bias signal to drive the other of said branches to a conducting state;

and pulse signal input means connected to introduce a pulse signal to said circuit branches whereby the reverse biased said circuit branch blocks all pulse signal information and the forward biased said circuit branch conducts and transmits signals of a predetermined polarity.

9. A pulse gate of the type which can be controlled by an AC signal including:

a first and a second transistor each having current conducting means and bias terminal means, said transistors having complementary conductance characteristics;

a first and a second diode connected to said current conducting terminal means of said first and said second transistors, respectively, said diodes being connected in opposite polarity relative to one another whereby one of said diodes will conduct pulses of a first polarity and the other of said diodes will conduct pulses of an opposite polarity relative to the first polarity;

bias means connected to introduce the AC signal to said bias terminal means of said transistors and alternately reverse biasing one of said transistors and forward biasing the other of said transistors whereby one of said transistors is cut off and the other of said transistors is conducting at any one time;

and input means connected to apply pulse information to said transistors whereby the conducting said transistor conducts the pulse information to the associated said diode and whereupon said diode transmits only those pulses having a predetermined polarity and whereby the reverse biased said transistor blocks conduction of all pulse information.

10. A pulse gate of the type which discriminates between positive and negative polarity pulses comprising:

a first and a second circuit branch including a first and second transistor, respectively, said transistors being of opposite polarity relative to one another;

a first and a second diode connected in circuit with said first and said second transistors, respectively, said diodes being connected with opposite current conducting characteristics relative to one another;

bias means connected to introduce an AC gating signal to said first and said second transistors to alternately bias one of said transistors to a cut-off state and forward bias the other said transistor to a conduction state;

and pulse input means connected to apply a pulse signal to said first and said second circuit branches whereby the cut-off transistor blocks all pulse conduction and the conducting transistor conducts all pulses to the associated diode and said diode transmits only those pulses of a predetermined polarity.

No references cited.

ARCHIE R. BORCHELT, *Primary Examiner.*

UNITED STATES PATENT OFFICE
CERTIFICATE OF CORRECTION

Patent No. 3,349,244                 October 24, 1967

Raymond W. Briggs et al.

It is hereby certified that error appears in the above numbered patent requiring correction and that the said Letters Patent should read as corrected below.

Column 1, line 16, for "Crosses" read -- Crossed --; line 29, for "did not" read -- did --; same line 29, for "backgrund" read -- background --; column 7, line 54, for "are" read -- arm --.

Signed and sealed this 7th day of January 1969.

(SEAL)
Attest:

Edward M. Fletcher, Jr.                 EDWARD J. BRENNER

Attesting Officer                      Commissioner of Patents